J. OLSON.
HAY RAKE.
APPLICATION FILED JULY 14, 1911.
1,050,992.
Patented Jan. 21, 1913.
3 SHEETS—SHEET 2.
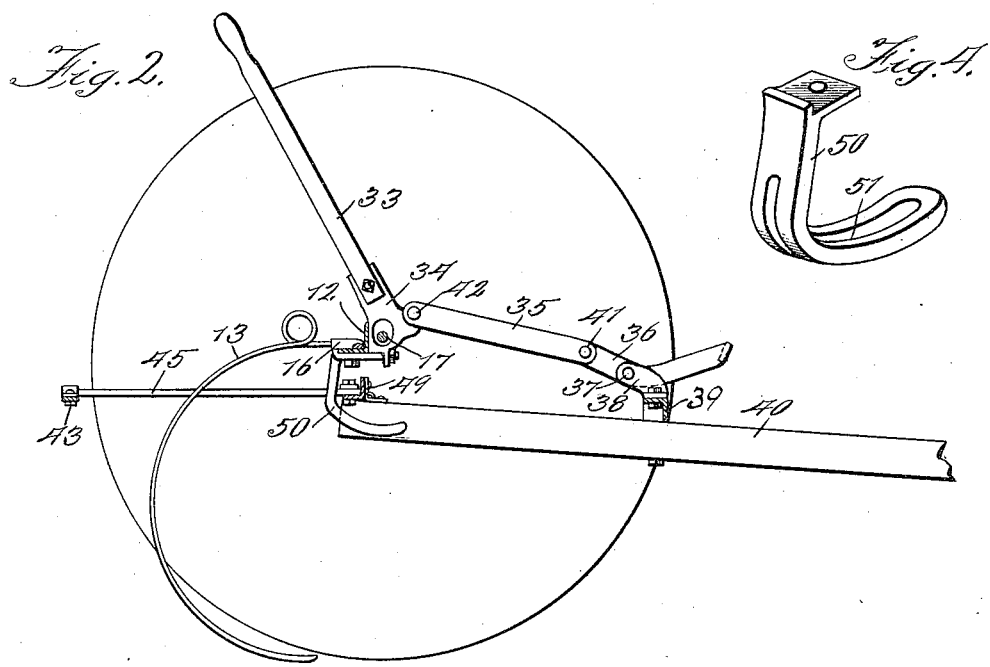
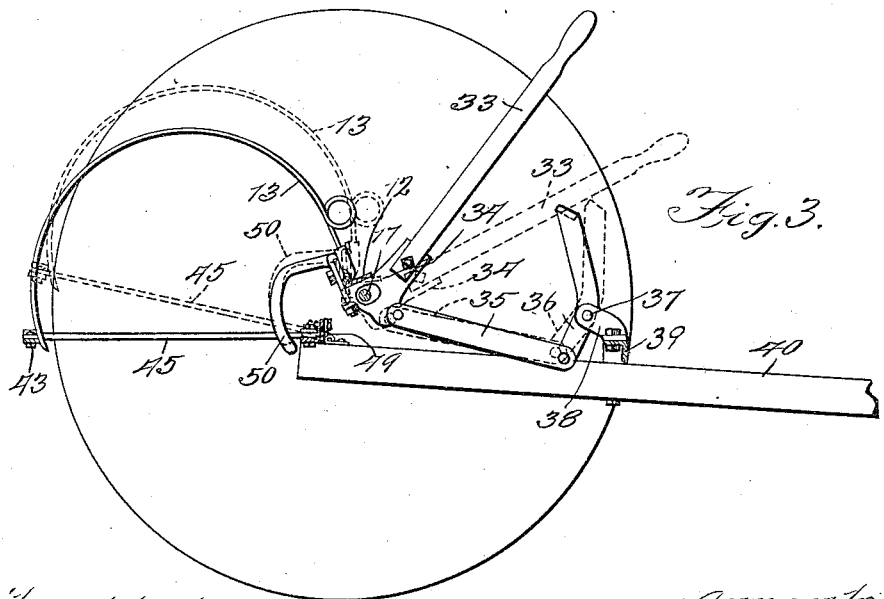

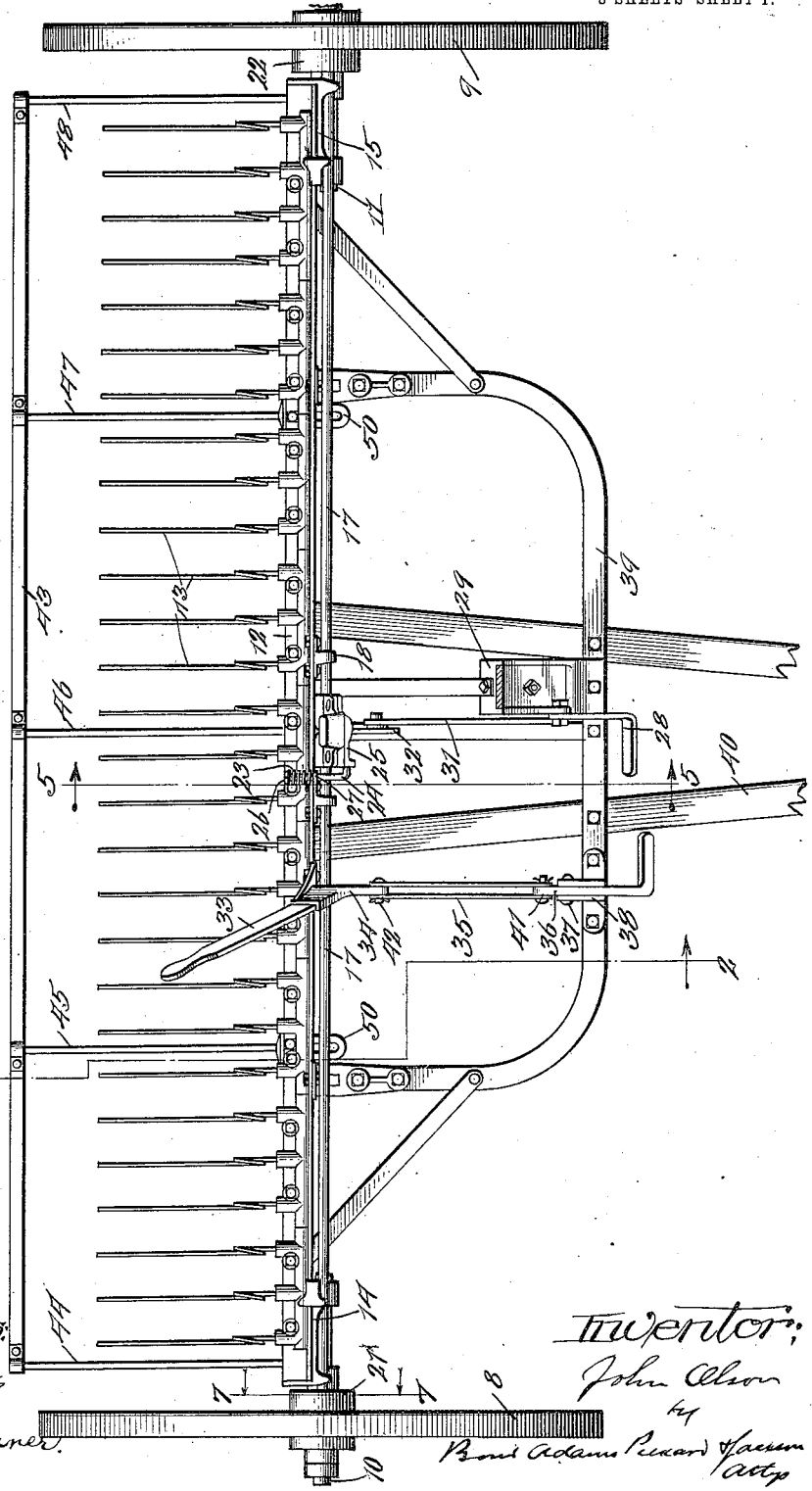

J. OLSON.
HAY RAKE.
APPLICATION FILED JULY 14, 1911.
1,050,992.
Patented Jan. 21, 1913.
3 SHEETS—SHEET 3.
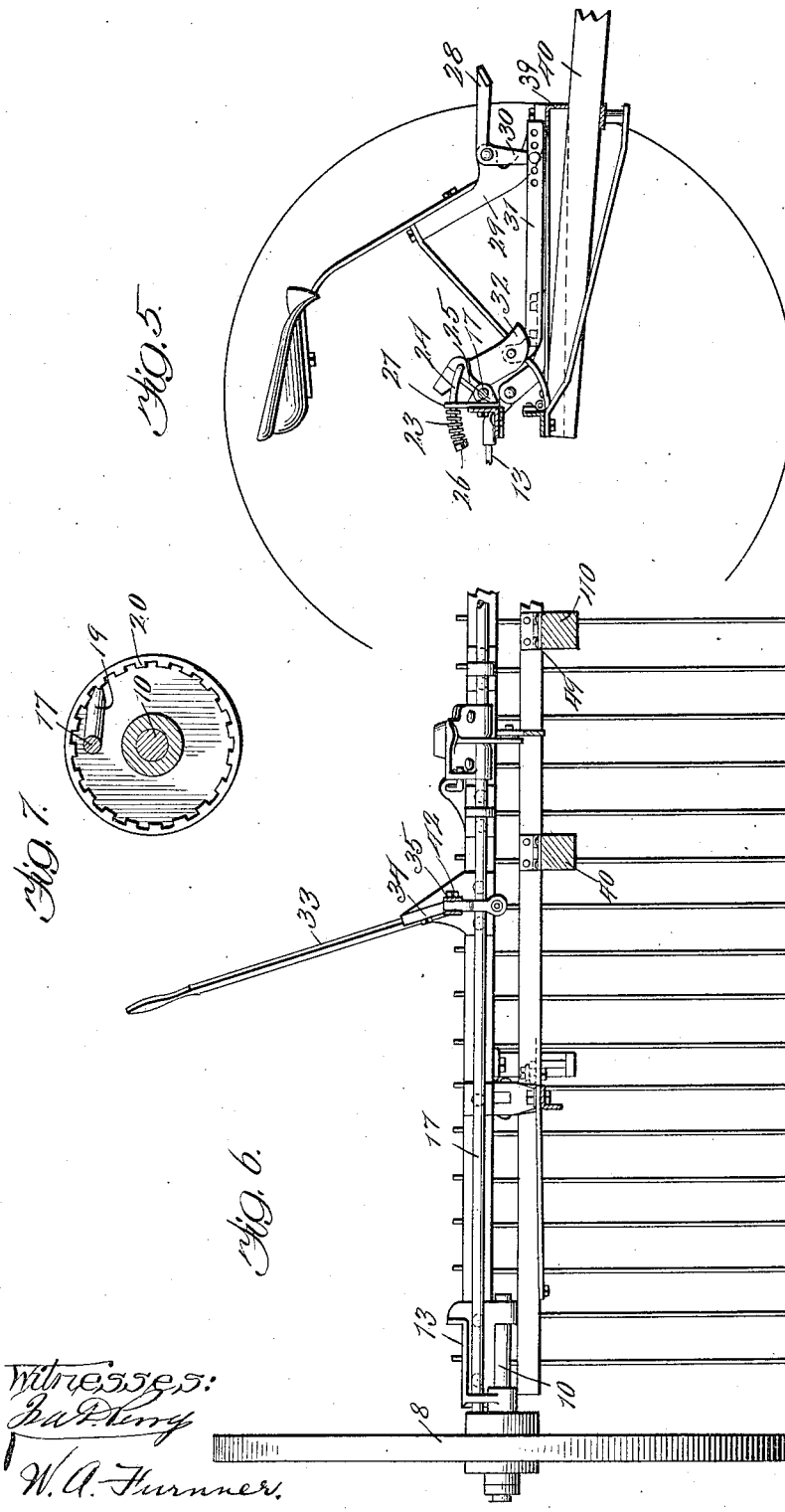

UNITED STATES PATENT OFFICE.

JOHN OLSON, OF BRADLEY, ILLINOIS, ASSIGNOR TO SEARS, ROEBUCK AND COMPANY, OF CHICAGO, ILLINOIS, A CORPORATION OF NEW YORK.

HAY-RAKE.

1,050,992.

Specification of Letters Patent.   Patented Jan. 21, 1913.

Application filed July 14, 1911.   Serial No. 638,511.

*To all whom it may concern:*

Be it known that I, JOHN OLSON, a citizen of the United States, residing at Bradley, in the county of Kankakee and State of Illinois, have invented certain new and useful Improvements in Hay-Rakes, of which the following is a specification, reference being had to the accompanying drawings.

My invention relates to hay rakes of the type commonly employed for bunching the hay, in which the rake-head is arranged to be rocked at intervals to release the hay collected by the teeth. In hay rakes of this type it is common to employ a cleaning frame arranged horizontally at the rear of the rake-head, through which the rake-teeth move, so that when the teeth are raised to release the hay the cleaning frame acts to strip the hay from the rake-teeth and prevent it from being carried up with the teeth. As heretofore constructed, however, such cleaning or stripping frames have either been fixedly secured in position, or they have been so arranged as to be capable of being swung downward as the rake teeth are moved upward, to strip the hay from the rake teeth. In neither of such constructions is sufficient space afforded to permit the cleaning or stripping frames or bars to properly clear the hay.

The object of my invention is to overcome this objection, and this I accomplish by mounting the cleaning or stripping frame so that it may be raised to properly clear the hay after it has performed its work in stripping the hay from the rake-teeth. This is effected when the points of the rake-teeth are lifted to a certain point, which, in the best embodiment of my invention, coincides with the level of the cleaning frame. In order to prevent the cleaning frame from rising while the rake is in operation, I also provide means by which it is held down at such times.

In the accompanying drawings, which illustrate one form in which my invention may be embodied,—Figure 1 is a plan view of a rake, the seat-support being in section; Fig. 2 is a view, partially diagrammatic, being substantially a fore-and-aft section on line 2—2 of Fig. 1, showing the rake in operative position; Fig. 3 is a similar view showing the rake in its elevated or discharging position and showing also in dotted lines the position of the parts when the cleaning frame is lifted out of its normal position; Fig. 4 is a perspective view of the bracket by which the position of the cleaning frame is controlled; Fig. 5 is a view, partly diagrammatic, being substantially a fore-and-aft section on line 5—5 of Fig. 1; Fig. 6 is a partial front view, some parts being in section; and Fig. 7 is a detail, being a vertical section on line 7—7 of Fig. 1.

Referring to the drawings,—8—9 indicate the usual carrying-wheels provided with spindles 10—11 about which the rake-head is adapted to rock. 12 indicates the rake-head, which is provided with the usual rake-teeth 13 and is mounted upon the spindles 10—11 by means of brackets 14—15, as best shown in Fig. 1. The rake-head 12 is preferably an angle-iron, the rake-teeth 13 being secured thereto by clips 16. The rake-head is rocked or partly rotated by means of a rod 17 which is rotatably connected with the head by means of brackets 18, or in any other suitable way, and at its ends is provided with dogs 19 adapted to engage teeth 20 on the inside of the hubs 21—22 of the wheels 8—9, as shown in Figs. 1 and 7. The arrangement is such that when the dogs 19 engage the teeth 20, forward movement of the machine causes the rake-head to rock so as to lift the rake-teeth and release the hay. The dogs 19 are normally held out of operative engagement with the teeth 20 by a spring 23, as shown in Fig. 5, which is mounted upon a rod 24 connected with a bracket 25 which is fixedly secured to the rod 17. As shown in Fig. 5, one end of the spring 23 bears against a head or nut 26 carried by the rod 24, the other end of said spring bearing against a plate 27 carried by the rake-head, the tendency of the spring being to hold the rod 17 in such position that the dogs 19 are out of engagement with the teeth 20. The rod 17 is rocked to move the dogs 19 into engagement with the teeth 20 by means of a foot-lever 28 mounted on a seat-supporting bracket 29 and connected by an arm 30 and connecting-rod 31 with an arm 32 attached to the bracket 25, as shown in Fig. 5. The construction and operation of these parts forms no part of my present invention, and I wish it to be understood that instead of using the construction illustrated for connecting and disconnecting the rake-head with the carrying-wheels for dumping purposes, any other suitable devices may be employed.

33 indicates a lever for restoring the rake-head to operative position, said lever being connected to a bracket 34 fixedly secured to the rake-head, as shown in Fig. 2, so that by rocking said lever the rake-head may be rocked. The bracket 34 is connected by a connecting-rod 35 with a foot-lever 36 mounted on a pivot 37 carried by a suitable bracket 38 secured to a frame 39 which extends forward of the rake-head, as shown in Fig. 1, and serves as a means of attachment for the members of the tongue 40.

41—42 indicate pivots connecting the connecting-rod 35 to the lever 36 and to the bracket 34, respectively. The location of these pivots with respect to the pivot 37 is such that when the rake-teeth are in operative position the pivot 41 lies slightly above a line drawn between the pivots 42 and 37, thereby forming a lock which holds the rake-teeth in operative position. The lock may be released to permit the rake-head to be rocked, however, by operating the lever 33.

43 indicates a transverse bar which, together with rods 44, 45, 46, 47 and 48 and a transverse bar or angle-iron 49, form a cleaning frame for stripping the hay from the rake-teeth when they are raised to dumping position. The bar 49 is hinged to the rear ends of the members 40 of the tongue, as shown in Figs. 2 and 3, so that it may rock to lift the rear bar 43 to a greater or less extent, as indicated by dotted lines in Fig. 3.

50 indicates a plurality of brackets, preferably three in number, which are secured to the rake-head, as shown in Figs. 2 and 3, and are provided with slots 51 which receive the rods 45—46—47. The number of brackets 50 employed, may, of course, be varied, and, if desired, one may be provided for each of the rods forming a part of the cleaning frame, but ordinarily that is not necessary. The brackets 50 are so shaped and the length of the slots 51 is so proportioned that when the rake-head is in its normal or operative position the rods 45—46—47 lie at the extreme upper ends of said slots and consequently prevent it from rising. When the rake-head is rocked to discharge the hay, the rake-teeth rise independently of the cleaning-frame until the points of the teeth are practically level with such frame, at which time the brackets 50 will have been moved so that the rods 45—46—47 lie in the extreme lower ends of the slots 51. Consequently further movement of the rake-head in the same direction will lift the cleaning frame, as indicated by dotted lines in Fig. 3, thus moving the cleaning frame farther from the ground and avoiding the danger of its striking and scattering the raked hay.

So far as I am aware, this is a novel feature in hay rakes, and the claims hereinafter made are therefore to be construed broadly, except in so far as they are directed to the details of the construction shown and described.

That which I claim as my invention, and desire to secure by Letters Patent, is,—

1. A hay-rake, comprising a rocking rake-head having rake-teeth, a cleaning device, and means for moving the cleaning device upward during the latter part of the upward stroke of the rake-teeth.

2. A hay-rake, comprising a rocking rake-head having rake-teeth, a cleaning device through which the rake-teeth move when rocked, said cleaning device being movably mounted so as to be adapted to be rocked up and down, and means for lifting the cleaning device during the latter part of the upward stroke of the rake-teeth.

3. A hay-rake, comprising a rocking rake-head having rake-teeth, a cleaning frame, means for moving the cleaning frame upward during the latter part of the upward stroke of the rake-teeth, and means for holding the cleaning frame stationary when the rake-teeth are in operative position.

4. A hay-rake, comprising a rocking rake-head having rake-teeth, a cleaning frame through which the rake-teeth move when rocked, said cleaning frame being movably mounted so as to be adapted to be rocked up and down, means for lifting the cleaning frame during the latter part of the upward stroke of the rake-teeth, and means for holding the cleaning frame stationary when the rake-teeth are in operative position.

5. A hay-rake, comprising a rocking rake-head having rake-teeth, a cleaning frame coöperating with said rake-teeth, and means carried by the rake-head for lifting the cleaning frame during the latter part of the upward stroke of the rake-teeth.

6. A hay-rake, comprising a rocking rake-head having rake-teeth, a cleaning frame coöperating with said rake-teeth, and means carried by the rake-head for lifting the cleaning frame during the latter part of the upward stroke of the rake-teeth and operating to hold the cleaning frame down when the rake-teeth are in operative position.

7. A hay-rake, comprising a rocking rake-head having rake-teeth, a cleaning frame coöperating with said rake teeth, and a slotted bracket carried by the rake-head for lifting the cleaning frame during the latter part of the upward stroke of the rake-teeth.

8. A hay-rake, comprising a rocking rake-head having rake-teeth, a cleaning frame coöperating with said rake-teeth, and a slotted bracket carried by the rake-head for lifting the cleaning frame during the latter part of the upward stroke of the rake-teeth and operating to hold the cleaning frame down when the rake-teeth are in operative position.

9. A hay-rake comprising a rocking rake-head having rake-teeth, a cleaning device for said rake-teeth, and means for rocking said rake-head independently of said cleaning device to release the hay and for subsequently simultaneously raising the rake-teeth and the cleaning device.

10. A hay-rake comprising a rocking rake-head having rake-teeth, a cleaning device for said rake-teeth, means for rocking said rake-head independently of said cleaning device to release the hay and for subsequently simultaneously raising the rake-teeth and the cleaning device, and means for holding the cleaning device stationary when the rake-teeth are in operative position.

JOHN OLSON.

Witnesses:
 W. R. BOND,
 F. L. MARTIN.

Copies of this patent may be obtained for five cents each, by addressing the "Commissioner of Patents, Washington, D. C."